T. D. FINIZIO.
BRACKET FOR ELECTRIC LAMPS AND THE LIKE.
APPLICATION FILED MAY 10, 1915.

1,166,753.

Patented Jan. 4, 1916.
2 SHEETS—SHEET 1.

Witness
S. A. Jarvis

Inventor
Thomas D. Finizio
by Maurice Block
attorney

T. D. FINIZIO.
BRACKET FOR ELECTRIC LAMPS AND THE LIKE.
APPLICATION FILED MAY 10, 1915.

1,166,753.

Patented Jan. 4, 1916.
2 SHEETS—SHEET 2.

Witness
E. A. Jarvis

Inventor
Thomas D. Finizio
attorney.

UNITED STATES PATENT OFFICE.

THOMAS D. FINIZIO, OF NEW YORK, N. Y., ASSIGNOR TO KURZ ELECTRICAL COMPANY, INC., OF NEW YORK, N. Y., A CORPORATION OF NEW YORK.

BRACKET FOR ELECTRIC LAMPS AND THE LIKE.

1,166,753. Specification of Letters Patent. Patented Jan. 4, 1916.

Application filed May 10, 1915. Serial No. 27,282.

*To all whom it may concern:*

Be it known that I, THOMAS D. FINIZIO, a subject of the King of Italy, residing at New York city, Bronx county, State of New York, have invented certain new and useful Improvements in Brackets for Electric Lamps and the like, of which the following is a full, clear, and exact description.

This invention relates to an improvement in lamp-brackets or the like, the object of the invention being to provide a bracket for electric lamps, fans, telephones, etc., with a rotatable self-winding reel to carry a two-wire cable for conducting electric current to the current-consuming device carried by the bracket.

A further feature of the invention consists of a novel arrangement of contacts or connections by which means the current is conducted from the cable to the lamp, fan, or telephone on the bracket, the said connections being arranged to permit of the movement of the cable, when wound or unwound, without breaking the electrical circuit.

Further features of improvement will hereinafter appear.

I will now proceed to describe my invention in detail, the essential features of which will be summarized in the appended claims, reference being had to the accompanying drawings, forming part hereof; wherein—

Figure 1:
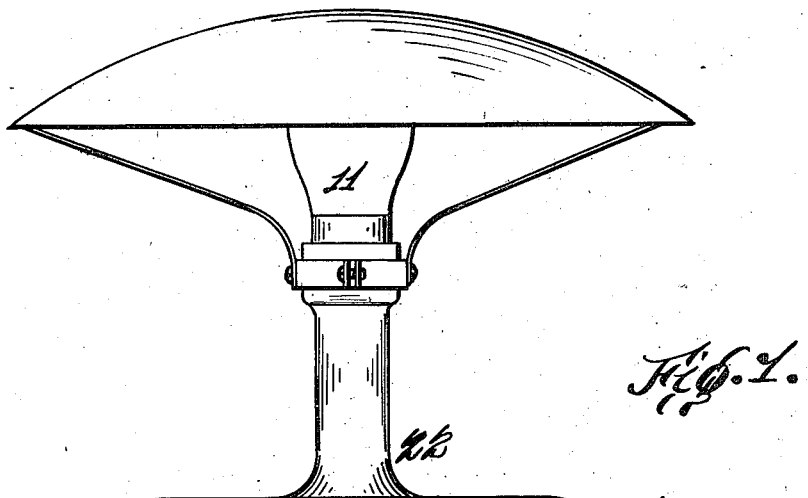
Figure 4:
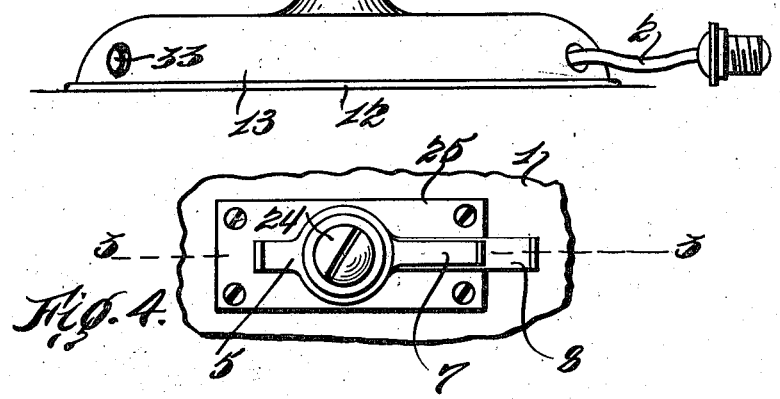
Figure 2:
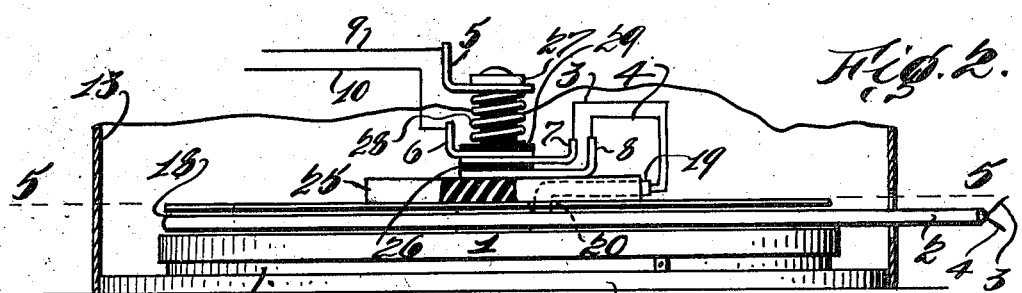
Figure 3:
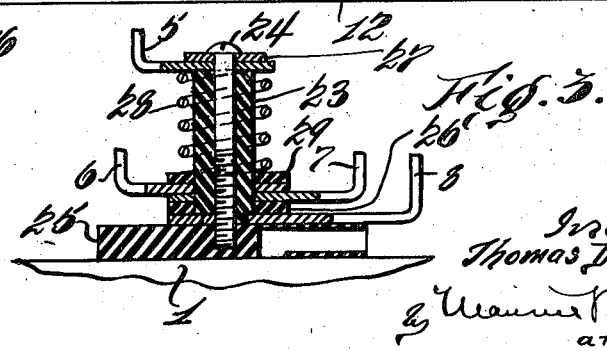
Figure 5:
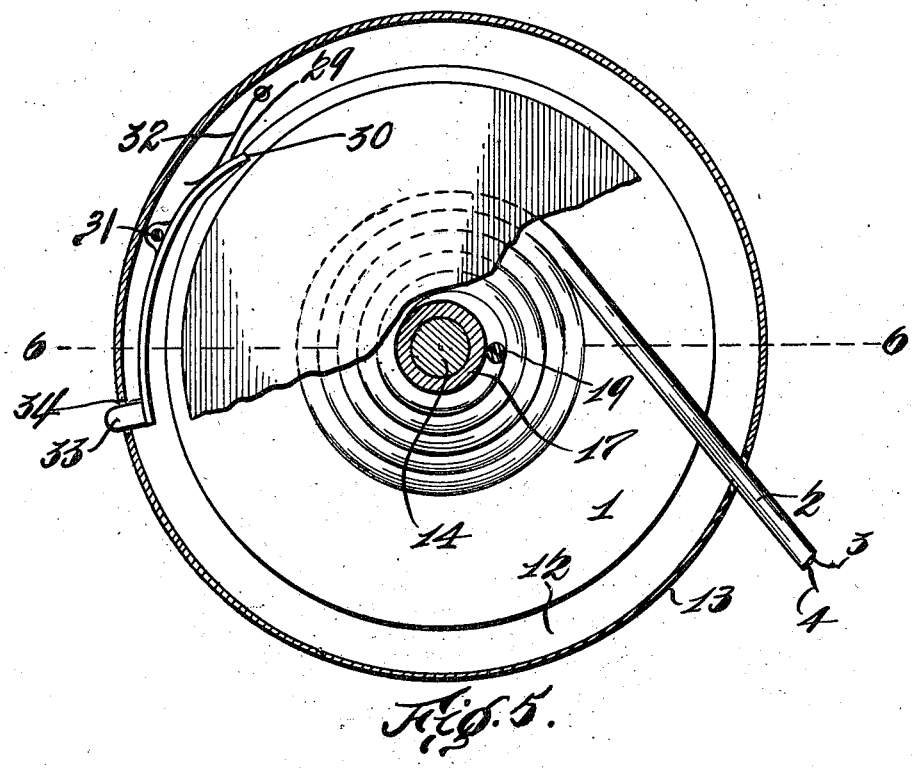
Figure 6:
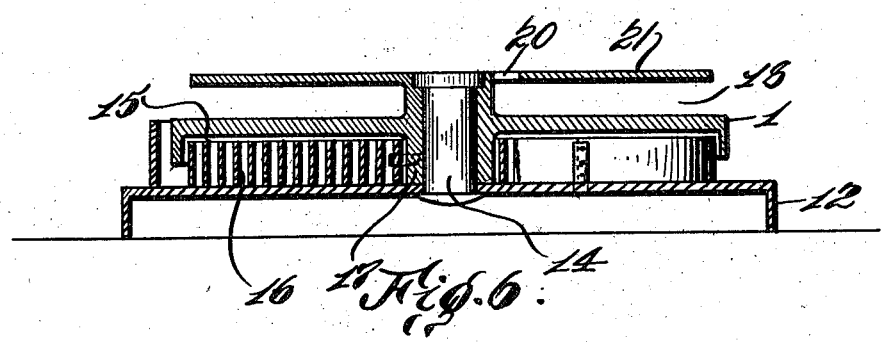

Figure 1 is a side elevation of a lamp-bracket embodying my improvements; Fig. 2 is an enlarged cross-sectional view of a portion of the casing of the bracket, the cable reel and associated parts being shown in elevation; Fig. 3 is an enlarged vertical sectional view of the rotary connections which form part of my invention; Fig. 4 is a top plan view thereof; Fig. 5 is an enlarged sectional plan view, the section being taken on a line 5—5 in Fig. 2; and Fig. 6 is a cross-sectional view, the section being taken on a line 6—6 in Fig. 5.

In the drawings I have shown a reel 1 upon which is wound a cable 2 carrying circuit wires 3 and 4 which, by means of rotary connections, consisting of arms 5, 6, 7 and 8, convey current to wires 9 and 10, which in turn are connected to a lamp 11 or other electrical device, such as a fan, telephone, etc. The reel 1 is pivotally mounted upon a base-plate 12, which has secured thereto a casing 13 to protect the reel and associated parts. The reel is mounted upon a pin 14 (see Figs. 5 and 6) secured to the plate 12.

The reel 1 is provided with a recess 15 in the bottom thereof which contains a coil spring 16. The spring 16 is at one end secured to the base-plate 12, the other end of the spring being secured to the hub 17 of the reel 1. The spring 16 will tend to wind the reel up. The unwinding of the cable 2 will place the spring 16 under tension so that when the cable is released from its connection with the main circuit, it will be wound up upon the reel 1. As will be seen in Fig. 5, the cable 2 is wound upon itself within the groove 18 of the reel, the inner end 19 passing upwardly through an opening 20 in the top plate 21 of the reel 1 (Fig. 6). When the reel is rotated, the inner projecting end 19 of cable 1 will rotate around the pin 14.

In combination and coöperating with the rotary reel 1, I employ movable connections (the above mentioned arms 5, 6, 7 and 8) to connect the wires 3 and 4 with the current consuming element carried by the bracket which I will designate as an entirety by 22.

As will be seen in Fig. 2, the wires 3 and 4 are connected to the arms 7 and 8, respectively, which arms are rotatably mounted upon a bushing 23, the bushing 23 being of insulating material, such as rubber, fiber or the like. The bushing 23 is secured, by a screw 24, to a block 25, of insulating material, carried by the reel 1. The arms 7 and 8 are insulated one from the other by a washer 26 of insulating material, but the arm 7 has in contact therewith the arm 6 to which is secured the supplemental circuit wire 10, the wire 9 being secured to the arm 5 which is held in contact with a washer 27, bearing against the head of the screw 24, by a spring 28, the spring being insulated from the arms 6 and 7 by a washer 29 of insulating material. As will be seen in Fig. 3, the screw 24 engages the arm 8. Hence the arms 5 and 8 will be in circuit with but insulated from the arms 6 and 7 which are in circuit one with the other. When the reel 1 rotates, the arm 8 will rotate with it. Although the arm 7 is free to rotate (that is to say, it is not secured permanently to any other part) it will rotate with the reel because of the connected wire 3 which will be stiff enough to cause the said arm 7 to travel with the plate. As the element carried by the bracket (the lamp 11 for instance) will be fixed, it would be undesirable to carry the wires 9 and 10 around with the reel. For this reason I provide the rotatably mounted arms 5 and 6, which permit the bushing 23 and pin 24 to rotate, while they, the arms 5 and 6, will remain stationary, because the said bushing 23 and spring 28 will move within the said arms 5 and 6 when the reel is rotated. In other words, the arms 5, 6 and 7 are loosely mounted upon the bushing 23, the spring 28 acting to keep the arms 6 and 7 and arm 5 and washer 27 in firm contact and at the same time forcing the washer 27 against the head of the screw 24.

To lock the reel against movement, that is, a rewinding movement, I employ a latch or pawl 29 which engages a notch 30 in the periphery of the reel 1. The pawl 29 is pivotally secured to the base-plate 12 by a screw 31 and is kept in engagement with the reel 1 by a spring 32. The latch or pawl 29 is released by pressing a button 33, carried thereby, the said button projecting through an opening 34 in the casing 13.

It will be seen that by the above described construction I am able to provide a bracket within which a conductor cable can be wound and kept out of the way when not in use. The said cable can be unwound and connected to a source of supply in a few moments. During the winding and unwinding the electrical connection will not be broken, as will be apparent.

Having now described my invention, what I claim and desire to secure by Letters Patent is:

1. In a lamp-bracket, a casing, a reel within said casing, an electric cable carried by said reel, the inner end of said cable passing upwardly through said reel, a plurality of rotatable metallic connectors carried by said reel and insulated one from the other, the wires within said cable being connected to some of said connectors, auxiliary conducting wires connected to the remaining connectors, and a pressure-exerting medium interposed between said connectors.

2. In combination with a rotatable reel, a cable carried thereby, said cable passing upwardly through said reel, a bushing of insulating material secured to said reel, a plurality of metallic connectors carried by said bushing, the endmost connectors being electrically connected, the intermediate connectors being also electrically connected but insulated from the endmost connectors, one wire within said cable being connected to the lowermost connector, the other wire being connected to one of the intermediate connectors, and an auxiliary circuit consisting of two wires one of which is connected to the uppermost connector, the other being connected to the remaining intermediate connector.

3. An electrical conducting device consisting of a plurality of rotatable arms, a carrier of insulating material, for said arms, a metallic support for said carrier passing therethrough, the said support electrically connecting the endmost arms, the intermediate arms being in contact one with the other, and a spring to keep said intermediate arms in contact, said spring acting to also keep the uppermost arm in circuit with said carrier support, said intermediate arms being insulated from the endmost arms.

4. The combination of a rotatable reel, a cable, consisting of a plurality of wires, carried by said reel, the inner end of said cable passing upwardly through said reel, a plurality of auxiliary stationary circuit wires, a rotary carrier carried by said reel, a plurality of connectors carried by said carrier but free to move thereupon, one set of said connectors being connected to the auxiliary circuit wires, the other set being connected to the cable wires, and to each other, said sets of connectors being insulated from each other and the said reel.

5. The combination of a rotatable reel having a recess in the bottom thereof, a base for said reel, a coil spring within said recess, one end of said spring being connected to said reel, the other end being connected to said base, said reel being provided with a notch in the periphery thereof, a releasable pawl to engage said notch, a spring to keep said pawl in engagement with said reel, said reel being provided with an annular groove, a coiled cable, consisting of a plurality of wires, located in said groove, the inner end of said cable passing upwardly through said reel, a plurality of rotatable arms, a carrier of insulating material for said arms carried by said reel, a metallic support for said carrier passing therethrough, the said support electrically connecting the endmost arms, the intermediate arms being in contact one with the other, and a spring to keep said intermediate arms in contact, said spring acting to also keep the uppermost arm in circuit with said carrier support, said intermediate arms being insulated from the endmost arms.

6. The combination of a rotatable reel, a cable, consisting of a plurality of wires, carried by said reel, the inner end of said cable passing upwardly through said reel, a plurality of auxiliary stationary circuit wires, a carrier of insulating material adjacent said reel, a plurality of sets of arms carried by said carrier, one of said sets of arms being electrically connected to said cable wires, said arms being insulated one from the other and arranged to rotate upon said carrier when said reel is rotated, the other set of arms being connected to said auxiliary circuit and insulated from each other, the last named set of arms being arranged to remain stationary when said reel is rotated, and means to place one arm of each set in circuit with the arm carrying the corresponding wire in the other set.

Signed at New York city, N. Y., this 7 day of May, 1915.

THOMAS D. FINIZIO.

Witnesses:
 EDWARD A. JARVIS,
 MAURICE BLOCK.